United States Patent Office 2,888,321
Patented May 26, 1959

2,888,321

MANUFACTURE OF ALKALI METAL POLYPHOSPHATES

Arthur N. Baumann, Lakeland, Fla., assignor to International Minerals & Chemical Corporation, a corporation of New York No Drawing. Application September 13, 1955
Serial No. 534,149

8 Claims. (Cl. 23—107)

This invention relates to detergents. More particularly, it relates to the manufacture of crystalline alkali metal phosphate salts. Still more particularly, it relates to the production of potassium tripolyphosphate and relatively pure calcium phosphates from impure phosphate solutions.

Numerous polyphosphates and their method of manufacture have been described in the literature. The methods of manufacture in general revolve around the fusion of relatively pure reactants and the controlled cooling of the fused material. Such processes have been expensive as regards both the chemical reactants and the processing operations involved.

It is a primary object of this invention to overcome the disadvantages and shortcomings of processes heretofore in use.

It is another object of this invention to provide a method utilizing inexpensive impure phosphoric acid as a raw material.

It is still another object of this invention to provide a method utilizing inexpensive reactants whereby a portion of the phosphate is recovered as relatively pure calcium phosphates.

These and other objects of the invention will be apparent to those skilled in the art from the following description.

In this new and novel process, an aqueous monopotassium orthophosphate solution having an alkali metal oxide to phosphorus pentoxide mol ratio in the range between about 0.9 and about 1.25 is reacted at a temperature in the range between about 70° C. and about 100° C. with an oxygen-bearing alkaline earth metal compound capable of forming insoluble phosphates. By the reaction, a relatively pure calcium phosphate, predominantly dicalcium phosphate is precipitated. Upon separation of the insoluble phosphates, a resultant solution is obtained having a mol ratio of alkali metal oxide to phosphorus pentoxide in any desired range, a range, for example, of between about 1.5 and about 1.75 will produce a tripolyphosphate final product when the solution is concentrated to a heavy paste form and heat treated at temperatures below fusion to produce a crystalline polyphosphate product.

The basic reactant in this process is an orthophosphate salt. This salt may be any alkali metal salt, for example, sodium, potassium, or lithium orthophosphate. With any of these starting materials or mixtures thereof, polyphosphates of various pure or mixed alkali metals can be prepared by adjustment of the phosphorus content of the solution utilizing alkaline earth metals whose phosphate salts are relatively insoluble such as magnesium, barium, etc.

After precipitation and separation of the alkaline earth metal phosphates, the resultant aqueous solution is concentrated to between about 65% and about 85% solids concentration. The high solids content material seldom can be allowed to reach a temperature during subsequent heat treatment in excess of about 1250° F. Generally the temperature used is in the range between about 800° F. and about 1250° F., and preferably the solids are maintained in the range between about 950° F. and about 1050° F.

The length of the heat treatment period in general varies inversely with the temperature, i.e., the higher the heat treatment temperature, the shorter the heat treatment time. For temperatures of about 1000° F., the solids are held at temperature for a period of 45 to 90 minutes. At temperatures above or below 1000° F., the period may be shorter or longer as required.

The amount of alkaline earth metal reactant added to adjust the alkali metal oxide to phosphorus pentoxide ratio will vary with the form of phosphate desired as the precipitate. The form is particularly influenced by temperature at the time of reaction. If, for example, calcium hydroxide is used as the precipitant, dicalcium phosphate or tricalcium phosphate may be precipitated depending upon whether the reaction temperature is above or below about 100° C.

In the preferred embodiment of the invention utilizing the least expensive of raw materials, impure aqueous solution of phosphoric acid, such as is obtained by digestion of Florida phosphate rock with sulfuric acid, is reacted with potassium chloride in a mol ratio of the order of about 1 mol $P_2O_5$:2 mols of potassium chloride. The reaction mixture is fired at a temperature in the range of between about 1400° F. and about 2000° F., preferably about 1600° F., to convert the reaction mixture to the potassium metaphosphate form and to drive off such impurities as the chloride, or if other reactants are used, such as potassium sulfate, to eliminate the sulfate, generally as the oxides of sulfur.

The metaphosphate material after heat treatment for a period of about one half hour to one hour is water quenched directly from the molten state and the quenched material hydrolyzed in an autoclave at pressures of the order of 100–200 lbs./sq. in. and at temperatures of the order of 150° C. to 250° C., for a period of between about 30 and about 10 minutes. By this pressure hydrolysis, the metaphosphate is converted to the orthophosphate in quantities of the order of 96%–99%. Upon conversion of the potassium salt to the orthophosphate state, the iron and aluminum impurities present in the system are precipitated and can be removed from the orthophosphate solution by suitable means such as centrifuging, filtration or equivalent operations.

To the aqueous solution of potassium orthophosphate is added a base such as calcium oxide or calcium hydroxide in quantity sufficient, based upon analyses of the phosphate solution, to adjust the $K_2O/P_2O_5$ mol ratio of filtrate to about 1.67.

After removal of the calcium phosphate precipitate by suitable means such as a filter, centrifuge or equivalent apparatus, the aqueous solution is concentrated in suitable apparatus such as steam heated evaporator, finishing in direct fired pan, or equivalent apparatus, until the solution was reduced to a paste having a solids content of about 80%. This paste having its components present in proportions equivalent to $K_5P_3O_{10}$ is heated in a suitable furnace such as an electric furnace, hearth furnace, rotary kiln and the like, at a temperature of approximately 1000° F. to 1050° F. for a period of between 45 and about 60 minutes.

The invention will be further understood from the following example which is given by way of illustration and without any intention that the invention be limited thereto.

*Example*

Phosphate rock was digested with aqueous sulfuric acid solution to produce a phosphoric acid solution having the following analysis:

| | Wt. percent |
|---|---|
| $P_2O_5$ | 55.2 |
| CaO | 0.364 |
| $Fe_2O_3$ | 2.20 |
| $Al_2O_3$ | 1.68 |
| $SO_4$ | 3.37 |

To 100 gallons of this solution was added 85 pounds of Sylvite (59% $K_2O$). The solution was evaporated to dryness (10% moisture content) and the reaction product heated to 1600° F. in an electric furnace.

Molten material removed from the electric furnace was quenched in water. Approximately 300 parts by weight of solution of K-metaphosphate was autoclaved for 15 minutes at a temperature of 190° C. and at a pressure of approximately 150 lbs. per sq. in. By pressure hydrolysis approximately 98% of the metaphosphate was converted to orthophosphate.

A precipitate of potassium, iron and aluminum phosphates was formed. The precipitate was removed by filtration.

Approximately 15 parts by weight of solids-free potassium orthophosphate solution of a salt concentration of 14% was mixed with 30 parts by weight of calcium oxide. With the temperature maintained at approximately 80° C. and after a reaction time of approximately 10 minutes, a precipitate was formed which comprises predominantly dicalcium phosphate having a P/F ratio of approximately 700. This precipitate was removed by filtration and dried, giving a product useful for animal feed.

The resultant filtrate having a mol ratio of $K_2O/P_2O_5$ of 1.67 was concentrated by evaporation to heavy paste form having a solids content of approximately 80% and the paste heated to approximately 1080° F. for 30 minutes.

The cool product was studied by X-ray and showed a diffraction pattern indicating crystalline structure.

The product was treated in accordance with the procedure described in Analytical Chemistry, 18 (7), pages 411–415, July 1946, to prove its sequestering action.

Four grams of solids were dissolved in distilled water and the solution diluted to 250 ml. The dilute solution was filtered to remove insoluble material. 25 ml. of the filtered solution was diluted to 45 ml. and the pH adjusted to 10 with sodium hydroxide. The pH adjusted solution was transferred to the photoelectric colorimeter and titrated with calcium chloride solution containing ¼ gram of calcium per 100 ml. of solution to the cloud point.

The product prepared in the example had a calcium value of 9.44 compared to Victor Chemical Corporation's sodium tripolyphosphate value of 9.63 and a commercial metaphosphate "glass" value of 10.

Having thus described my invention, what I claim is:

1. The method of preparing a crystalline alkali metal polyphosphate which comprises adding to an aqueous alkali metal orthophosphate solution a water soluble oxygen-containing alkaline earth metal reactant capable of forming a substantially water insoluble phosphate salt, and having a negative radical selected from the group consisting of oxide, hydroxide and carbonate, said addition being in quantities sufficient to adjust the alkali metal oxide to phosphorus pentoxide molar ratio in the remaining solution to between about 1.5:1 and about 1.75:1 by precipitation of said insoluble phosphate from said orthophosphate solution, separating the precipitated phosphates, concentrating the resultant aqueous solution to a paste having a solids content of between about 65% and about 85% by weight, and converting said paste to crystalline solid by heat treatment at a temperature in the range between about 800° F. and about 1250° F. for between about 30 minutes and about 90 minutes.

2. The method of preparing a crystalline alkali metal polyphosphate which comprises adding to an aqueous alkali metal orthophosphate solution having an alkali metal oxide to $P_2O_5$ mol ratio in the range between 0.9:1 and 1.25:1, a water soluble oxygen-containing alkaline earth metal reactant whose phosphate salt is water insoluble, and having a negative radical selected from the group consisting of oxide, hydroxide and carbonate, said addition being in quantities to produce an alkali metal oxide to $P_2O_5$ mol ratio in the remaining solution of between about 1.5:1 and about 1.75:1, by precipitation of said insoluble phosphate from said orthophosphate solution, separating the precipitated phosphate, concentrating the resultant aqueous solution to a paste having a solids content of between about 65% and about 85% by weight, and converting said paste to crystalline solid by heat treatment at a temperature in the range between about 900° F. and about 1200° F. for between about 30 minutes and about 90 minutes.

3. The method of preparing a crystalline alkali metal polyphosphate which comprises adding to an aqueous alkali metal orthophosphate solution having an alkali metal oxide to $P_2O_5$ mol ratio in the range between 0.9:1 and 1.25:1, a water soluble oxygen-containing calcium reactant whose phosphate salt is water insoluble, and having a negative radical selected from the group consisting of oxide, hydroxide and carbonate, said addition being in quantities to produce an alkali metal oxide to $P_2O_5$ mol ratio in the remaining solution of between about 1.5 and about 1.75, by precipitation of said insoluble phosphate from said orthophosphate solution, separating the precipitated phosphate, concentrating the resultant aqueous solution to a paste of between about 65% and about 85% solids concentration, and converting the paste to crystalline solid by heat treatment at a temperature in the range between about 900° F. and about 1200° F. for between about 30 minutes and about 90 minutes.

4. The method of preparing a crystalline alkali metal polyphosphate from impure phosphoric acid which comprises reacting the impure phosphoric acid with alkali metal chloride, heat treating the reaction mixture at a temperature in the range between about 1400° F. and about 2000° F., quenching the heat treated material with water, hydrolyzing the aqueous solution quenched material to the orthophosphate state, adding to the orthophosphate solution a soluble oxygen-containing alkaline earth metal reactant capable of forming substantially insoluble phosphates, said addition being in quantities sufficient to adjust the alkali metal oxide to $P_2O_5$ mol ratio in the remaining solution to between about 1.5:1 and about 1.75:1, by precipitation of said insoluble phosphate from said orthophosphate solution, separating the precipitated phosphates, concentrating the resultant aqueous solution to a paste having a solids content of between about 65% and about 85% by weight, and converting said paste to crystalline solid by heat treatment at a temperature in the range between about 800° F. and about 1250° F.

5. The method of preparing a crystalline potassium polyphosphate from impure phosphoric acid which comprises reacting the impure phosphoric acid with potassium chloride, heat treating the reaction mixture at a temperature in the range between about 1400° F. and about 2000° F., quenching the heat treated material with water, hydrolyzing the aqueous solution quenched material to the orthophosphate state, adding to the orthophosphate solution a soluble oxygen-containing calcium reactant capable of forming substantially insoluble phosphate, said addition being in quantities sufficient to adjust the potassium oxide to $P_2O_5$ mol ratio in the remaining solution to between about 1.5:1 and about 1.75:1, by precipitation of said insoluble phosphate from said orthophosphate solution, separating the precipitated phosphates, concentrating the resultant aqueous solution to a paste having a solids content of between about 65% and about 85% by weight, and converting said paste to crystalline solid by heat treatment at a temperature in the range between about 800° F. and about 1250° F.

6. The method of preparing a crystalline alkali metal polyphosphate from impure phosphoric acid which comprises reacting the impure phosphoric acid with alkali metal chloride, heat treating the reaction mixture at a temperature in the range between about 1400° F. and about 2000° F., quenching the heat treated material with water, hydrolyzing the aqueous solution quenched material to the orthophosphate state, adding to the orthophosphate solution calcium hydroxide in quantity sufficient to adjust the alkali metal oxide to $P_2O_5$ mol ratio in the remaining solution to between about 1.5:1 and about 1.75:1, by precipitation of dicalcium phosphate from said orthophosphate solution, separating precipitated dicalcium phosphate, concentrating the resultant aqueous solution to a paste having a solids content of between about 65% and about 85% by weight, and converting said paste to crystalline solid by heat treatment at a temperature in the range between about 800° F. and about 1250° F.

7. The method of preparing a crystalline alkali metal polyphosphate from impure phosphoric acid which comprises reacting the impure phosphoric acid with alkali metal chloride, heat treating the reaction mixture at a temperature in the range between about 1400° F. and about 2000° F., quenching the heat treated material with water, hydrolyzing the aqueous solution quenched material to the orthophosphate state, adding to the orthophosphate solution calcium hydroxide in quantity sufficient to adjust the alkali metal oxide to $P_2O_5$ mol ratio in the remaining solution to between about 1.5 and about 1.75 by precipitation of dicalcium phosphate from said orthophosphate solution, separating precipitated dicalcium phosphate, concentrating the resultant aqueous solution to a paste of about 65% to about 85% solids content and converting said paste to crystalline solid by heat treatment at a temperature in the range between about 800° F. and about 1250° F.

8. The method of preparing a crystalline potassium tripolyphosphate from impure phosphoric acid which comprises reacting the impure acid with potassium chloride, evaporating the reaction mixture to substantial dryness, heat treating the reaction mixture at a temperature of approximately 1600° F., quenching the heat treated material with water, hydrolyzing the aqueous solution of quenched material to the potassium orthophosphate state, removing precipitated iron and aluminum phosphate, adding to the hydrolyzed solution calcium oxide, separating precipitated dicalcium phosphate from solution having a $K_2O/P_2O_5$ mol ratio of about 1.67, concentrating the resultant aqueous filtrate to a paste of approximately 80% solids content, and converting said paste to crystalline tripolyphosphate by heat treatment at approximately 1080° F.

References Cited in the file of this patent
UNITED STATES PATENTS

| | | |
|---|---|---|
| 2,064,979 | Kaselitz | Dec. 22, 1936 |
| 2,493,809 | Garrison | Jan. 10, 1950 |
| 2,767,045 | McCullough | Oct. 16, 1956 |